United States Patent
Stephenson

(10) Patent No.: US 10,844,961 B2
(45) Date of Patent: Nov. 24, 2020

(54) MECHANICAL SEAL SUPPORT SYSTEM

(71) Applicant: Heath Stephenson, Nailsworth (GB)

(72) Inventor: Heath Stephenson, Nailsworth (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 15/908,530

(22) Filed: Feb. 28, 2018

(65) Prior Publication Data

US 2018/0216736 A1 Aug. 2, 2018

Related U.S. Application Data

(63) Continuation-in-part of application No. 14/889,920, filed as application No. PCT/GB2014/000182 on May 9, 2014, now abandoned.

(30) Foreign Application Priority Data

May 9, 2013 (GB) .................................. 1308379.5

(51) Int. Cl.
*F16J 15/34* (2006.01)
(52) U.S. Cl.
CPC ....... *F16J 15/3464* (2013.01); *F16J 15/3404* (2013.01); *Y10T 137/6416* (2015.04)
(58) Field of Classification Search
CPC ......... B08B 9/08; B08B 9/0813; B08B 9/093; F16J 15/3404; F16J 15/3464; F28F 9/18; F28D 7/024; F28D 7/022; F28D 20/0034; Y02E 60/142; Y10T 137/6416; Y10T 137/6579
See application file for complete search history.

(56) References Cited

U.S. PATENT DOCUMENTS

| | | | | |
|---|---|---|---|---|
| 396,354 A | * | 1/1889 | Dwyer | F16L 23/10 285/411 |
| 669,673 A | * | 3/1901 | Averbeck | F16L 23/10 285/411 |
| 984,086 A | * | 2/1911 | Graham | F16L 23/10 285/410 |
| 1,202,969 A | * | 10/1916 | Cornell | C10M 175/0033 208/185 |
| 1,863,958 A | * | 6/1932 | Wulff | F17C 9/02 62/46.1 |
| 2,360,468 A | * | 10/1944 | Brown | F25J 3/04 62/656 |

(Continued)

*Primary Examiner* — Kevin F Murphy
*Assistant Examiner* — Jonathan J Waddy
(74) *Attorney, Agent, or Firm* — Edwin D. Schindler

(57) ABSTRACT

A mechanical seal support system for a sealing device for sealing a piece of industrial equipment, includes a mechanical seal for sealing the piece of industrial equipment and a system vessel for containing barrier fluid for the mechanical seal and being circumferentially split into a plurality of sections detachably attached for retaining pressure. The system vessel includes a clean-in-place (CIP) assembly, a cooling element and device for sterilizing the system vessel. The device for sterilizing the a heating element is formed as a coiled tubular element for the barrier fluid to pass therethrough, with closed-loop pipe work included for connecting the system vessel to the mechanical seal and a drain and filling device for removing and adding the barrier fluid to the system vessel.

10 Claims, 7 Drawing Sheets

(56) References Cited

U.S. PATENT DOCUMENTS

| | | | | |
|---|---|---|---|---|
| 2,541,205 A * | 2/1951 | Christophersen | ....... | F16L 23/08 285/210 |
| 3,031,148 A * | 4/1962 | Holdren | ........ | B05B 1/14 134/166 R |
| 4,263,498 A * | 4/1981 | Meyers | ........ | F24H 1/188 137/205.5 |
| 4,429,718 A * | 2/1984 | Mercier | ........ | F15B 1/14 138/30 |
| 4,466,251 A * | 8/1984 | Chellis | ........ | F01L 25/06 137/340 |
| 4,518,149 A * | 5/1985 | Gardner | ........ | F16K 27/07 137/556 |
| 4,992,644 A * | 2/1991 | Webb | ........ | A61L 2/04 219/440 |
| 5,170,988 A * | 12/1992 | Chronister | ........ | F16K 27/07 137/347 |
| 5,531,188 A * | 7/1996 | Tomasulo | ........ | B08B 9/093 122/379 |
| 7,497,229 B2 * | 3/2009 | Tahir | ........ | F04D 29/108 137/391 |
| 7,914,053 B2 * | 3/2011 | Keller | ........ | F16L 23/036 285/364 |
| 2005/0269067 A1 * | 12/2005 | Cowans | ........ | F28D 1/06 165/157 |
| 2006/0213928 A1 * | 9/2006 | Ufheil | ........ | A47J 31/46 222/148 |
| 2007/0075006 A1 * | 4/2007 | Watanabe | ........ | B67D 3/0009 210/181 |
| 2008/0276730 A1 * | 11/2008 | Basten | ........ | B01L 3/508 73/863.86 |
| 2009/0060482 A1 * | 3/2009 | Tsai | ........ | F24H 1/101 392/485 |
| 2009/0130704 A1 * | 5/2009 | Gyure | ........ | C12M 21/02 435/41 |
| 2009/0183778 A1 * | 7/2009 | Wildegger | ........ | B60S 1/487 137/13 |
| 2011/0011069 A1 * | 1/2011 | Umeno | ........ | F28D 7/022 60/320 |
| 2012/0055159 A1 * | 3/2012 | Hicks | ........ | F01K 3/00 60/650 |

* cited by examiner

Detail A

MECHANICAL SEAL SUPPORT SYSTEM

CROSS-REFERENCE TO RELATED APPLICATIONS

This is a continuation-in-part of U.S. patent application Ser. No. 14/889,920, filed Nov. 9, 2015, now abandoned, which represents the U.S. National Phase patent application, pursuant to 35 U.S.C. § 371, of P.C.T. International Patent Application No. PCT/GB2014/000182, filed May 9, 2014.

BACKGROUND OF THE INVENTION

Technical Field of the Invention

The present invention relates, generally, to mechanical seal support systems and, more particularly, to mechanical seal support systems, which are used with mechanical seals for the containment of process fluid.

Description of the Prior Art

A seal support system typically comprises of a vessel or tank, which generally contains a volume of fluid. The vessel is piped to a sealing device on a pump, mixer or item of rotating equipment. Generally a return pipe is lead back to the vessel from the sealing device, hence closing the "loop." This allows the fluid, contained in the vessel, to enter and exit the sealing device. Typically such a seal support system is employed with a mechanical seal with two or more sets of seal faces, more commonly referred to as a double or dual seal.

The fluid within the vessel is generally chosen so that it lubricates and cools the components within the sealing device, whilst being compatible with the process fluid. The industry term for the fluid contained within the vessel, is barrier or buffer fluid, e.g., a barrier or buffer liquid.

It is not uncommon for the mechanical seal support system to have other items of equipment, sited around the vessel, to permit pressure being applied to the barrier/buffer fluid, or to allow additional cooling or fluid circulation around the seal.

Generally the sealing device sited on the item of rotating equipment is a mechanical seal comprising of a rotating member, which is secured to a shaft, and a stationary member which is secured to a housing.

The interface, between the rotating member and the stationary member, on the mechanical seal, prevents the processed product from escaping.

It has been found that it is difficult to ensure the vessel of a seal support system, and therefore the mechanical seal remains sterile during use. Due to the closed loop arrangement the barrier fluid is recycled rather than discharged as waste immediately after cooling the mechanical seal. Hence, the barrier fluid is at risk of becoming stagnant within the vessel and/or contaminated and this may lead to the growth of pathogens such as bacteria, viruses and/or fungi. There are certain industries in which the sterility of machinery is essential, for example in the food, beverage or pharmaceutical industry.

Accordingly, these industries are unable to use conventional seal support systems to maintain barrier fluid within a mechanical seal, unless they meet the requirements of the FDA.

It is deemed advantageous, to resolve this sterilization problem by having a closed loop mechanical seal support system which can be separated down and easily cleaned, whereby, by example only: a production line finishes production. The rotating equipment stops and at which point the seal support system presently filled with un-sterilized barrier fluid. The barrier fluid is the drained from the system. The system is flushed with water to "push out" the barrier fluid. The system is then cleaned appropriately using any/all of the following methods: 1. The system is taken apart and manually cleaned before re-assembly. 2. The system is cleaned-in-place ("CIP") with an appropriate acid or cleaning agent. 3. The system is heated to 70° C. or higher, and held for a period of 30 minutes. The system is then flushed with cold water for 30 minutes Preferably, the barrier fluid system drain is positioned at the lowest point in the system arrangement, thereby ensuring all the fluid within the system and seal loop pipe work, is removed.

Preferably, process steps 2 and 3, as referenced above, are controlled automatically and the need for manual intervention is eliminated, which could be achieved through the use of automatic and timed instrumentation, valves, motors and solenoids.

Given the example above, some plants would be ready to start production at this stage, however in the dairy industry, specifically during the manufacturing of milk, the next steps of the CIP process would often be; circulate a mixture with enzymes through the system and leave it in the system overnight (12 hours), then flush the system with coed water for 30 minutes. The barrier fluid facing parts of the system and pipe work are cleaned-in-place with acid for 30 minutes. The system is flushed with cold water for 30 minutes. The system is refilled with the barrier fluid and pressurized to the correct operating condition.

The dairy process and equipment would then be then ready to start production.

Therefore, a modular seal support system range of the invention is offered, so that the various procedures and conditions of different industries can be accommodated from the ability to disassemble the system so that it may be cleaned to including CIP and heating procedures in order that the system may be cleaned and sterilized. The described invention allows these procedures whereas no mechanical seal vessel of the nature of this invention are in existence today.

SUMMARY OF THE INVENTION

According to the present invention there is provided a seal support system for use with a sealing device employed to seal a piece of industrial equipment which, broadly includes, a mechanical seal support system which includes a system vessel for containing barrier fluid, a closed loop pipe work to connect the aforementioned system vessel to a sealing device such as a mechanical seal, a drain and filling means for removing and adding barrier fluid to the system vessel, wherein the system vessel contains a fluid and is connected to a sealing device adjacent to the barrier fluid contacting surfaces are either or all of the following: A method by which the primary half of the vessel may be detached and reattached to the secondary half of the vessel; a CIP assembly to permit cleaning operations to be conducted; a primary element connected to an external source so as to permit fluid to be circulated within the system; a secondary element connected to a power source so as to permit temperature controlling operations to be conducted.

More particularly, the present invention provides a mechanical seal support system for a sealing device for sealing a piece of industrial equipment, which includes a mechanical seal for sealing the piece of industrial equipment, a system vessel for containing a barrier fluid for said mechanical seal and being circumferentially split into a plurality of sections detachably attached for retaining pressure, the system vessel including a clean-in-place ("CIP") assembly, a cooling element and means for sterilizing the system vessel with the means for sterilizing including a heating element formed as a coiled tubular element for barrier fluid to pass therethrough, closed-loop pipe work for connecting the system vessel to the mechanical seal, and drain and filling means for removing and adding the barrier fluid to the system vessel.

Preferably, the method by which the primary half of the vessel may be detached or reattached to the secondary half of the vessel comprises of two interfacing profiles, fixed to the primary and secondary halves of the vessel and being fixed or fixing together to form a the interior vessel cavity.

Preferably, the two interfacing profiles are similar in their design, such that a single profile may be used on both the primary and secondary halves of the vessel.

Preferably, the primary half and secondary half assemblies are secured together by a jointed circular fastener which encircles the vessel and has an angled cross-section thus creating a closing force between the primary and secondary vessel assemblies.

Preferably, the primary and secondary halves of the vessel seal together around an elastomeric ring.

Preferably, the primary and secondary halves of the vessel fit together with the jointed circular fastener such the a cavity is formed between the two adjacent faces of the interfacing profiles wherein the profile of the aforementioned cavity is inversely similar to that of the profile of the elastomeric ring.

Preferably, the CIP assembly has inner and outer surfaces and one or more communication orifices between such, thereby permitting a cleaning agent, at pressure and/or temperature to communicate from the inner most surfaces to the outer most surface and thereby communicated to the barrier fluid contactable surfaces of the vessel and pipe work.

Preferably, the CIP assembly rotates, preferably under the force of the fluid applied to it, so that cleaning agent is circumferentially sprayed uniform ally to the inner most surfaces of the vessel.

Preferably, the primary element is of a coiled design with a coiled tubular cavity, each end of which connects to one or more communication orifices in the body of the vessel such that a temperature controlled fluid may be circulated through the primary element.

Preferably, the fluid circulated within the cooling element will not at any point come into contact with the barrier fluid contactable surfaces.

Preferably, the source of the fluid circulated within the cooling element is external to the vessel and may be controlled automatically so that the system may be cooled at set times or when it reaches a set temperature.

Preferably, the heating element is communicated to through an orifice in the vessel, whereby the metallic element may heat a body of fluid, in contact with the barrier fluid contactable surfaces.

Preferably, the heating element is connected to a programmable control system through an orifice such that heating cycles may be externally and/or automatically controlled.

Preferably, the system of the invention is supplied with a pressure gauge and/or a flow indicator and/or a pressure regulator and/or check valve and/or air vent valve and/or three-way valves such that status of the system may be automatically or otherwise controlled.

Preferably, all valves, inlets, heating elements, cooling elements, CIP elements shall be connect such that they may be externally controlled through the use of motors, automatic valves, solenoids or other such control mechanisms.

Preferably, the fill and drain valves shall be connect such that the vessel may be filled or drained through an externally controlled means.

Preferably, the system vessel, pipe work and all barrier fluid contactable surfaces of the invention of the design, are provided without threads, bug traps or and closed cavities which cannot be easily cleaned.

Preferably, the system of the invention is supplied with a drain valve at the lowest gravitational point of the vessel.

Preferably the vessel is made of a material which is substantially non-corrosive.

Preferably, a non-corrosive vessel material would be 316 stainless steel.

Preferably, there are no windowed orifices in the system of the invention, which allow the barrier fluid to be contacted by light, thereby causing concerns for accelerated bug growth.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

The reader will relate to various benefits of the seal support system of the invention which will now herewith be described with the aid of the following drawings. The reader will note the modularity of each of the embodiments of the system of invention and relate that the separate elements, being the cooling coil, heating element and CIP assembly, are all elements that may be included or not included in any/all embodiments of the system of invention.

Figure 1:
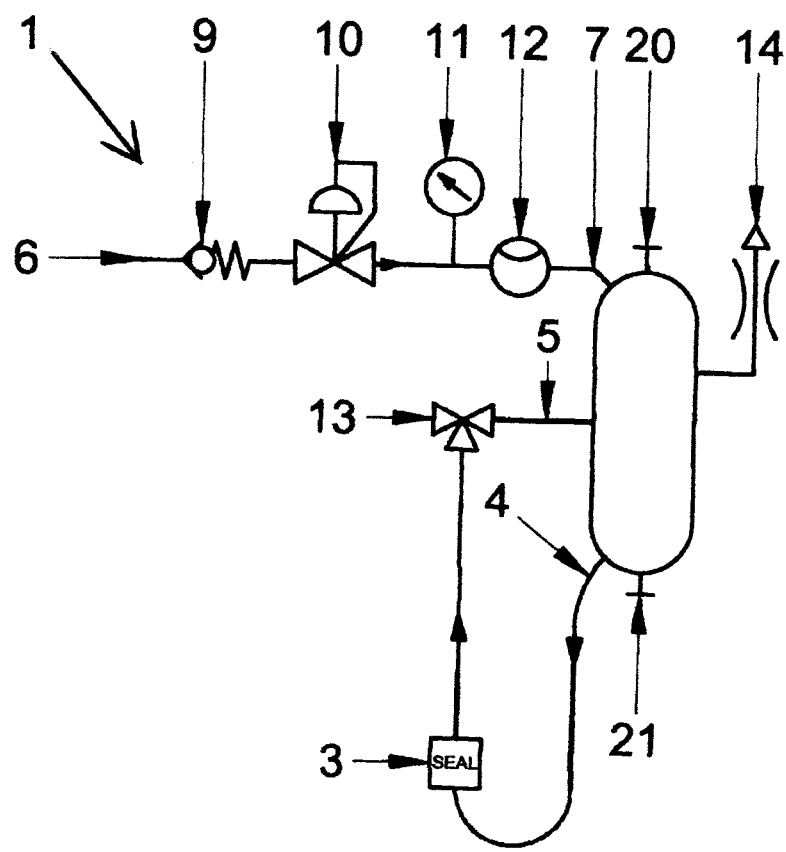
FIG. 1 is a Pipe and Instrumentation Diagram (P&ID) of the preferred embodiment of the system of the invention.

FIG. 1 is a P&ID detailing the system of invention 1 and showing how an item of industrial equipment is sealed with a sealing device such as a mechanical seal 3. The seal is connected to a vessel 1 with inlet 4, three-way valve 13 and return pipe 5. The vessel 1 is preferably connected to a mains fluid supply 6 via pipe work 7. The mains fluid supply provides barrier fluid to the inner most surfaces 8 (see FIG. 2) of the vessel 1. Preferably, the three-way valve 13 is positioned such that fluid may be, but not limited to, flushed through the seal and drained from the system. Preferably, pipe work 7 is connected to a check valve 9, pressure regulator 10, pressure gauge 11, and flow indicator 12, so that the pressure at the inlet of the barrier fluid from the mains source 6, can be regulated to the seal 3. Preferably, the system of invention includes an air vent valve 14 to ensure that the air gap within the vessel 1 is maintained to stop hydrostatic lock.

Figure 2:
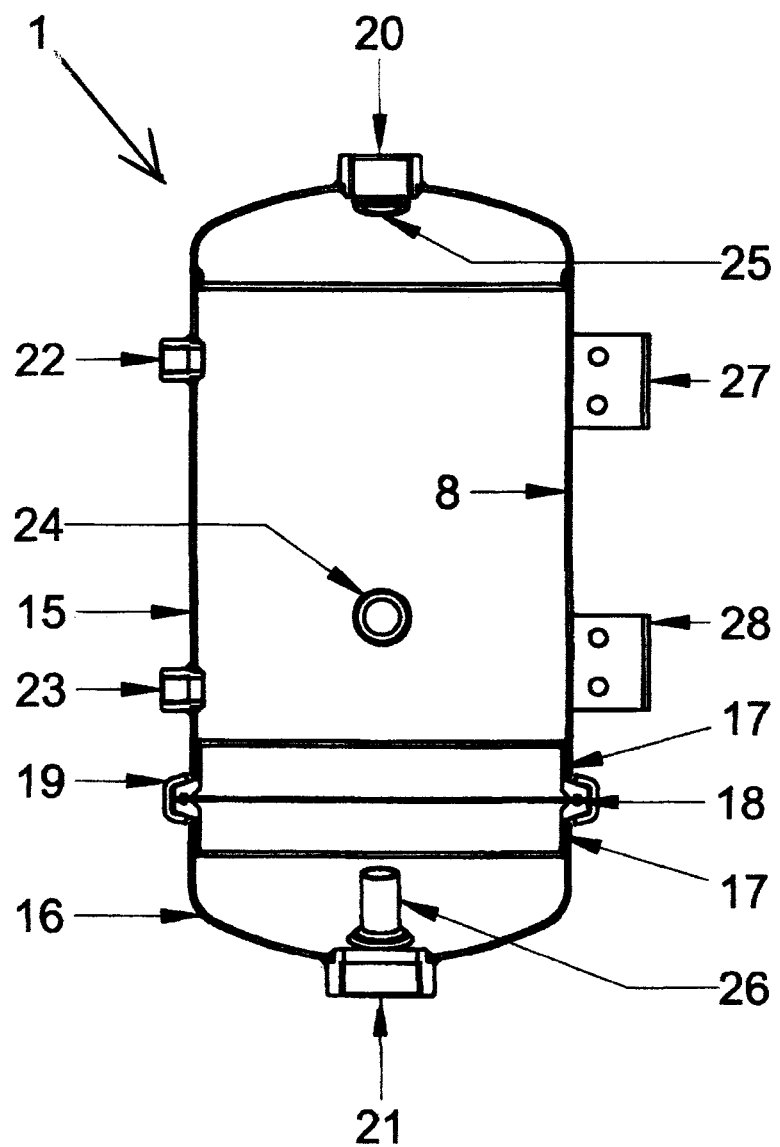
FIG. 2 is a cross sectional view of the primary embodiment of the system of the invention with clamping ring only.

FIG. 2 is a cross-sectional view of the primary embodiment of invention described above, such as that the two sections of the vessel 1; being section 15 and section 16, have each a ferrule 17 fixed to the largest opening of either section. Said ferrules 17 interlock with a rubber circular ring 18 made out of nitrile, and furthermore, a jointed circular fastener 19 which encircles the vessel 1 and encompasses the ferrules 17 and the elastomeric ring 18. Furthermore the vessel is provided with two major orifices, 20 and 21 (which are also indicated on FIG. 1) and any number of additional orifices represented here by orifice 22, orifice 23, orifice 24, orifice 25 and orifice 26. Additionally the preferred embodiment of the vessel is held in its intended position by brackets 27 and 28. Preferably, the rubber ring 18 and the two cylindrical connections 17 have a convolution along their profiles such that the rubber ring 18 fits into the opposing convolutions of the two ferrules 17. Preferably, the ferrules 17 attached to the two sections of vessel 1, being section 15 and section 16, are similar in their profile, such that a single ferrule 17 may be used for both the sections of the vessel 1.

Figure 3:
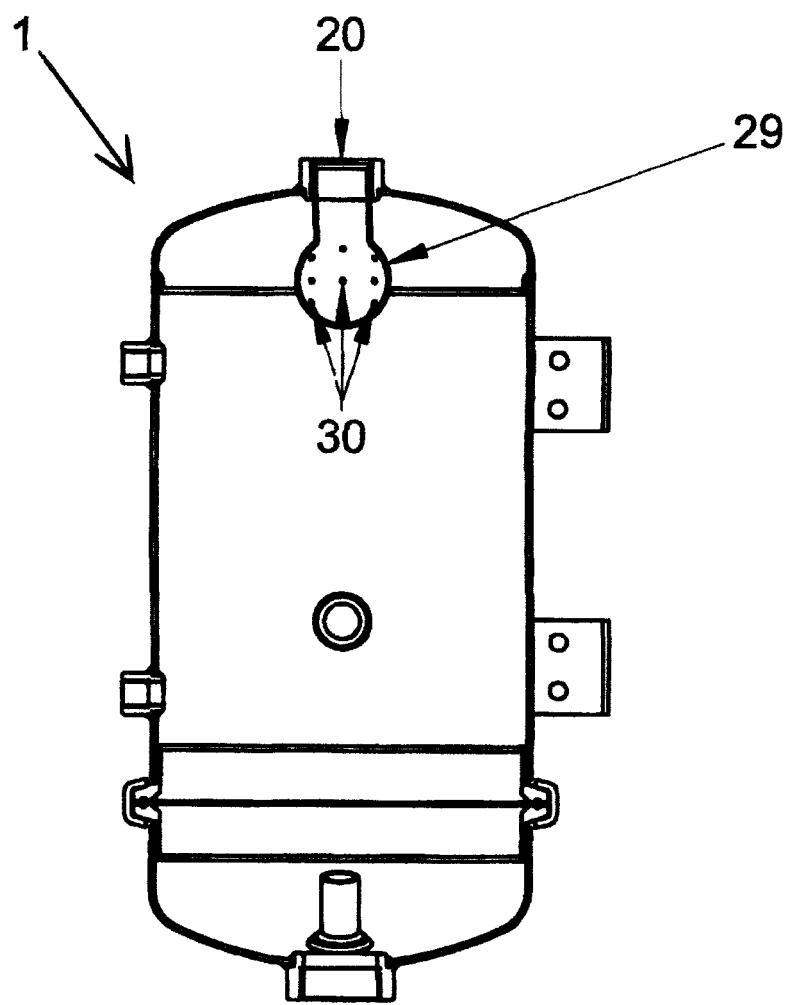
FIG. 3 is a cross sectional view of the secondary embodiment of the system of the invention with clamping ring and CIP assembly.

FIG. 3 is a cross-sectional view of the secondary embodiment of the system of invention described in FIG. 1 and FIG. 2, and includes a cleaning ball 29 made of steel, comprising one or more orifices 30 situated about the exterior surface such that there is a communication pathway between the inner most section of the ball to the outermost section of the ball. Preferably, the cleaning ball 29 is attached to orifice 20 such that fluid may be fed through the orifice 20 and distributed to the barrier fluid contacting surfaces by the cleaning ball 29 through the orifice or orifices 30.

Figure 4:
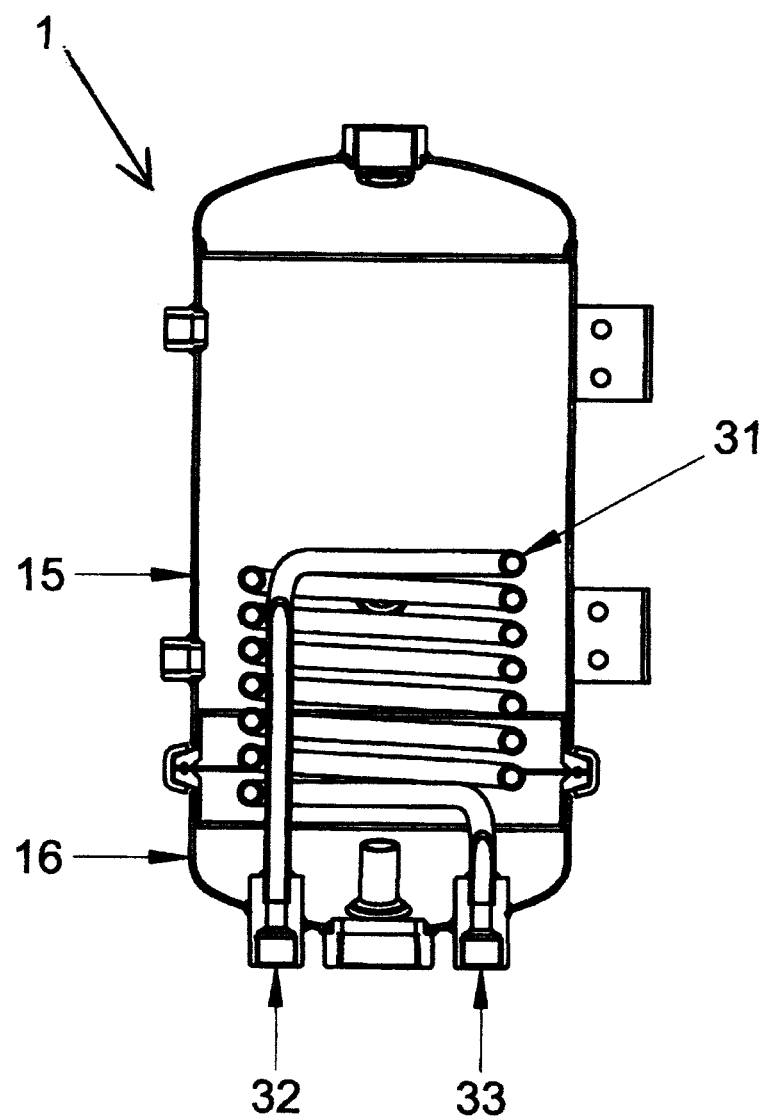
FIG. 4 is a cross sectional view of the third embodiment of the system of the invention with clamping ring and cooling coil.

FIG. 4 is a cross-sectional view of the third embodiment of the system of invention described in FIG. 1 and FIG. 2, whereby a convoluted element 31 is situated in the internal cavity formed by the two sections of vessel 1, being section 15 and section 16, and connected to two orifices 32 and 33, such that fluid may be passed through either of the aforementioned orifices and pass out of the opposing orifice without coming into contact with any of the barrier fluid contactable surfaces of the vessel 1.

Figure 5:
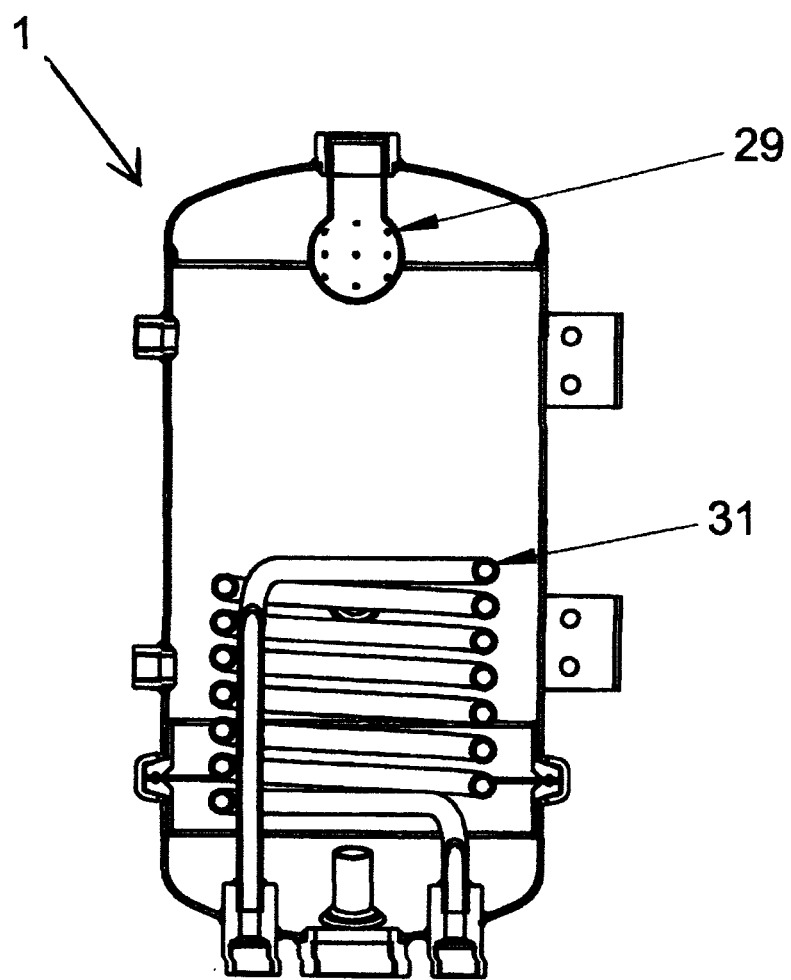
FIG. 5 is a cross sectional view of the fourth of the system of the invention with clamping ring, cooling coil and CIP assembly.

FIG. 5 is a cross-sectional view of the fourth embodiment of the system of invention described in FIG. 1, FIG. 2, FIG. 3 and FIG. 4, whereby both the cleaning ball 29 and the convoluted coil 31 are included in the same embodiment of the system.

Figure 6:
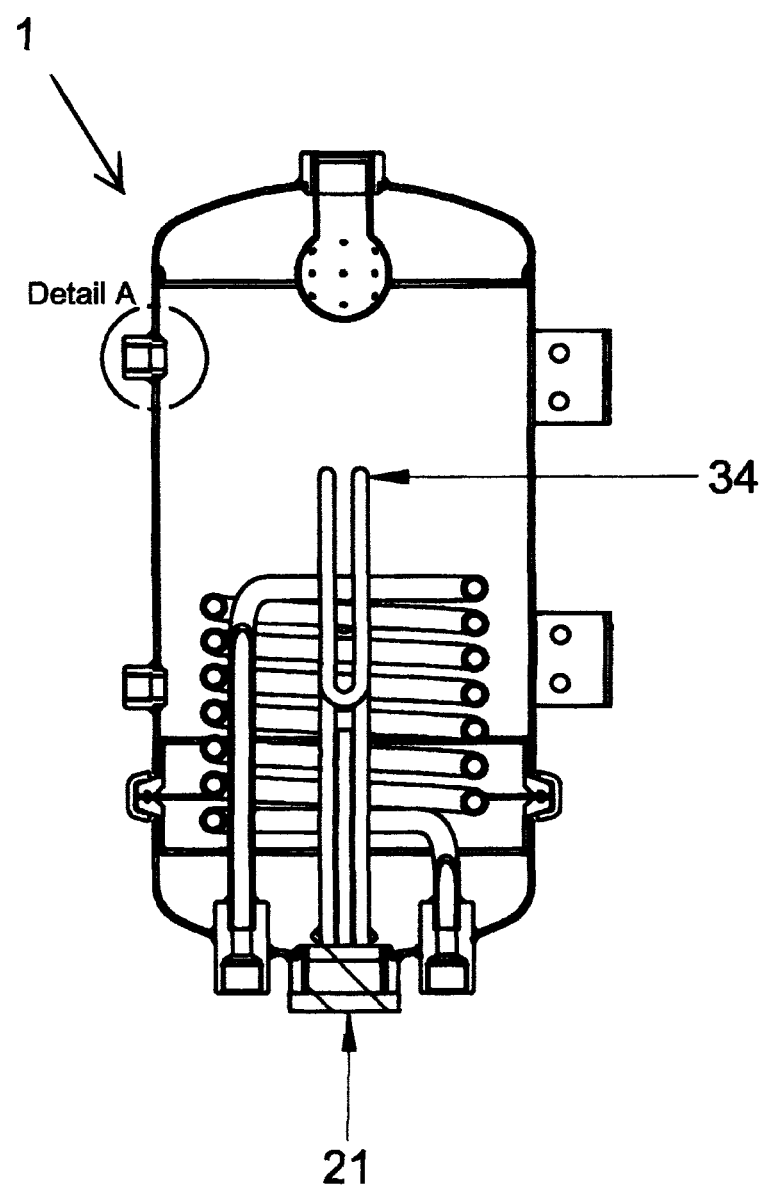
FIG. 6 is a cross sectional view of the fifth of the system of the invention with clamping ring, cooling coil, heating element and CIP assembly; and, FIG. 7 is a detail view of a welded section of the system of the invention

FIG. 6 is a cross-sectional view of the fifth embodiment of the system of invention described in FIG. 1, FIG. 2, FIG. 3, FIG. 4 and FIG. 5, whereby the system of invention detailed in FIG. 5, and all subsequent figures, also encapsulates a secondary convoluted metallic element 34. Preferably, the secondary convoluted metallic element 34 is communicated to through orifice 21 by an external power supply such that, as and when required, the vessel 1 and all fluid in contact with the barrier contactable surfaces may be heated to a defined temperature and held for a defined amount of time.

Preferably, the secondary convoluted metallic element 34 may be set to automatically raise the temperature of the fluid within the system to a predefined temperature and hold it for a predefined amount of time.

Figure 7:
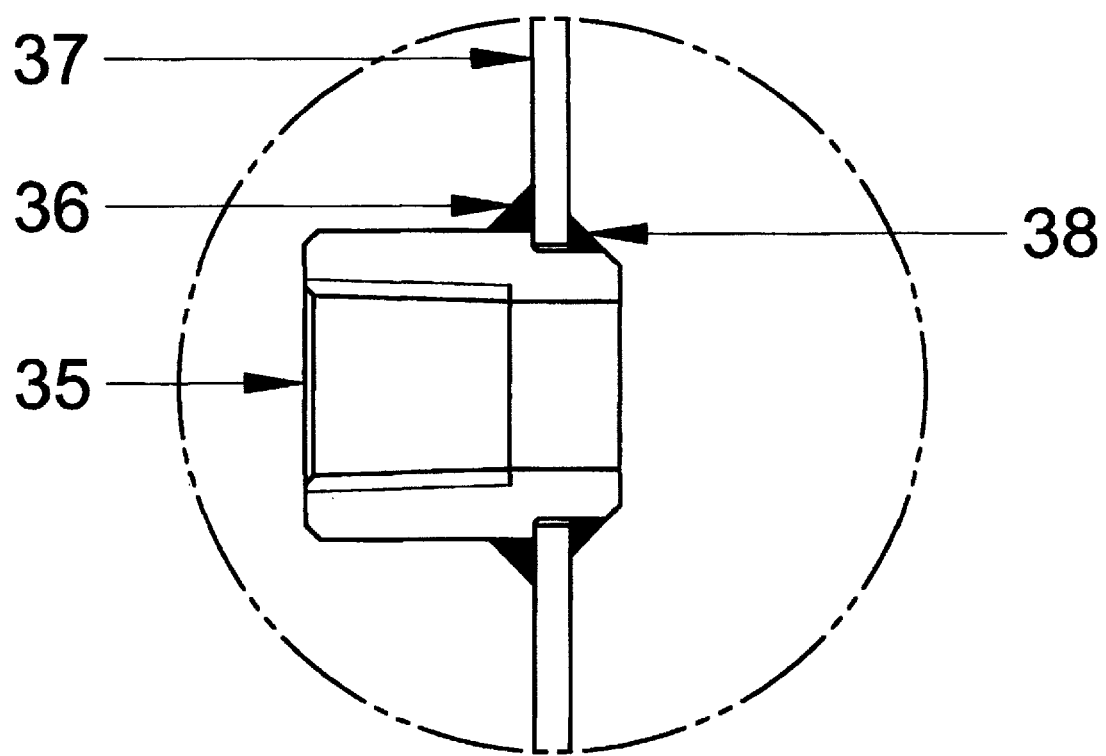

FIG. 7 is a detail view of a welded coupling present on all embodiments of the invention whereby it is shown that for the coupling 35 there is an exterior weld 36, present on the exterior 37 of the vessel 1, and in interior weld 38 on the interior 8 (see FIG. 2) of the vessel 1 such that the interior present body of the coupling does not present a viable bug trap. Preferably, for all components present in any embodiment of the system of invention that are in contact with the exterior of the vessel 37 and the interior of the vessel 8 (see FIG. 2) shall incorporate a weld on both the outside and the inside of the vessel 1 such that the fluid within the system is not exposed to any bug traps.

Preferably, the system vessel 1 for containing a barrier fluid for the mechanical seal 3 is circumferentially split into a plurality of sections detachably attached for retaining pressure, the system vessel 1 including the clean-in-place assembly, a cooling element and means for sterilizing the system vessel with the means for sterilizing including a heating element formed as a coiled tubular element for barrier fluid to pass therethrough, closed-loop pipe work for connecting the system vessel to the mechanical seal, and drain and filling means for removing and adding the barrier fluid to the system vessel.

The experienced reader will note that FIGS. 1 through to 7, present a number or embodiments of the system of invention but does not limit the embodiment to those outlined above such that one embodiment of the system of invention may contain a different permutation of the features outlined above.

While only several embodiments of the present invention have been shown and described, it will be obvious to those skilled in the art that many modifications may be made to the present invention without departing from the spirit and scope thereof.

What is claimed is:

1. A seal support system for a sealing device for sealing a piece of industrial equipment, comprising:
   a mechanical seal for sealing the piece of industrial equipment;
   a system vessel for containing barrier fluid for said mechanical seal and being circumferentially split into a plurality of sections detachably attached for retaining pressure, each section of said plurality of sections includes a ferrule with each said section being attached to an adjacent section of said plurality of sections, said ferrules of each of two said adjacent sections being encompassed by a circular and angled fastener having an inclined surface encircling said system vessel so that, on closing said adjacent sections together, said fastener draws said ferrules of said two adjacent sections together with a circular elastomeric ring located between said ferrules of said two adjacent sections, and further including a coupling secured to said system vessel via an exterior weld and an interior weld, said system vessel including a clean-in-place (CIP) assembly, a cooling element and means for sterilizing said system vessel, said means for sterilizing including a heating element formed as a coiled tubular element for barrier fluid to pass therethrough, wherein said cooling element and said heating element are each located within said system vessel and with both of said cooling element and heating element being coiled and tubular;

closed-loop pipe work for connecting said system vessel to the mechanical seal; and, drain and filling means for removing and adding the barrier fluid to the system vessel.

2. The seal support system for the sealing device for sealing the piece of industrial equipment according to claim 1, wherein said system vessel includes the clean-in-place (CIP) assembly having an input orifice and an output communication orifice so that fluid passing into the input orifice of the clean-in-place (CIP) assembly is able to be dispersed through the output orifice.

3. The seal support system for the sealing device for sealing the piece of industrial equipment according to claim 1, wherein said cooling element has a coiled tubular cavity connected to at least one communication orifice, so that interior contents of said system vessel are temperature-controlled.

4. The seal support system for the sealing device for sealing the piece of industrial equipment according to claim 3, wherein fluid circulated through said cooling element does not come into contact with barrier fluid contactable surfaces.

5. The seal support system for the sealing device for sealing the piece of industrial equipment according to claim 3, further comprising means for automatically controlling temperature of said seal support system either at set times or in accordance with set stimuli.

6. The seal support system for the sealing device for sealing the piece of industrial equipment according to claim 3, wherein said heating element is externally controllable for implementing set heating cycles.

7. The seal support system for the sealing device for sealing the piece of industrial equipment according to claim 1, wherein said coiled tubular element is connected to at least one communication orifice for connection to an external power source and for permitting internal contents of said seal support system to be heated.

8. The seal support system for the sealing device for sealing the piece of industrial equipment according to claim 1, further comprising at least one of a pressure gauge, a flow indicator, a pressure regulator, a check valve, an air vent valve and a three-way valve for automatically controlling said seal support system.

9. The seal support system for the sealing device for sealing the piece of industrial equipment according to claim 1, wherein said barrier fluid is a barrier liquid.

10. The seal support system for the sealing device for sealing the piece of industrial equipment according to claim 1, wherein said barrier fluid is a barrier buffer.

* * * * *